Figure 1:
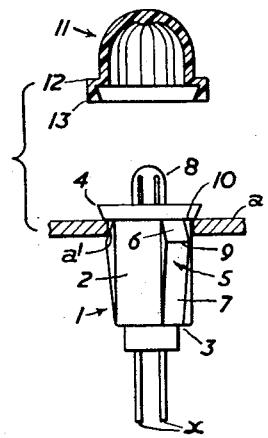

Nov. 7, 1961    E. A. GREASLEY    3,007,599
MEMBER FOR ASSEMBLY IN AN APERTURE IN A SUPPORT
Filed March 31, 1958

INVENTOR:
ERIC ARTHUR GREASLEY,
BY Walter S. Jones
ATTORNEY.

3,007,599
MEMBER FOR ASSEMBLY IN AN APERTURE IN A SUPPORT
Eric Arthur Greasley, Stapleford, England, assignor to United-Carr Fastener Corporation, Wilmington, Del., a corporation of Delaware
Filed Mar. 31, 1958, Ser. No. 725,356
Claims priority, application Great Britain Apr. 24, 1957
1 Claim. (Cl. 220—18)

This invention relates to a member adapted to be mounted in an aperture in a support and more especially to the provision of improved means whereby the member can be readily secured in assembly in the aperture.

Heretofore it has been the practice to provide such members with a separately formed attaching device including resilient fingers adapted to make snap fastener engagement with the edge of the aperture in the support. Such attaching devices are usually made of metal and are secured to the member by means such as an annular ring. The use of such separately formed attaching devices adds considerably to the cost of the member as not only has the cost of manufacturing the device to be considered but also the cost of assembly.

According to the present invention the member is moulded from synthetic plastic material, for example nylon, and includes a tubular body portion having a relatively thin and therefore flexible wall formed with a flange or the like at or adjacent one end and extending radially outwardly. The said wall is also formed with one or more ribs or the like extending longitudinally of its outer surface, the rib or ribs tapering from a point of greatest thickness adjacent to the flange, towards the end of the body remote from the flange.

The member is adapted to be inserted in an aperture having a cross section slightly less than the diameter of a circle which includes the portions of the ribs of greatest thickness. The member is inserted into the aperture from the end remote from the flange and as it is forced through the aperture the rib or ribs will engage the edge of the aperture and by virtue of being supported on a relatively thin and therefore flexible wall will flex inwardly to permit the member to pass into the aperture until the flange abuts the adjacent face of the support. The thickened end of the tapered rib or ribs is spaced inwardly of the flange a distance approximately corresponding to the thickness of the panel or like support, and accordingly when the flange abuts the said face the said adjacent end of the rib or ribs will have been snapped past the opposite face of the support and the shoulder formed by the end of the rib will engage the said opposite face of the support so that the member will be held in assembly.

Preferably the rib or ribs are hollow so as to have a degree of flexibility in themselves.

Two or more tapered ribs may be provided and according to one example of the invention three ribs are formed on the body of the member at equi-spaced positions circumferentially.

If desired each rib may have a short integral extension of reverse taper extending from the point of greatest thickness adjacent the flange towards the flange.

The member may take various forms and according to one embodiment it comprises a socket or housing for an electric lamp adapted to be mounted in an aperture on part of the frame of a domestic appliance such as a refrigerator or on the dash panel of a motor vehicle.

Figure 2:
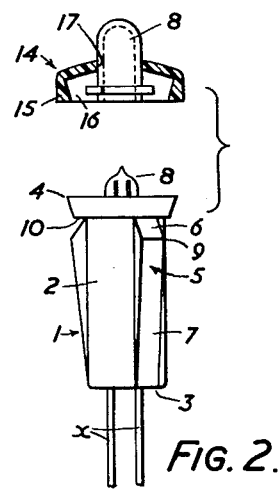
Figure 3:
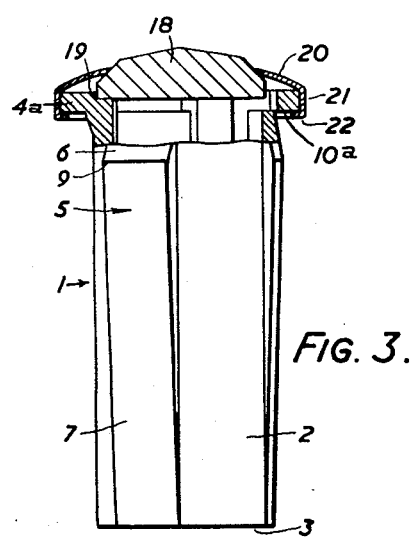

One embodiment of the invention will now be described with reference to the accompanying drawing, of which, FIG. 1 is a side view, partly in cross-section of an electric lamp socket, and FIG. 2 is a similar view of a modified form of the invention, and FIG. 3 is a similar view of another modified form of lamp socket.

As shown in the accompanying drawing a lamp socket 1 includes a hollow tubular body 2 moulded from nylon or other moulded synthetic composition. The body 2 is of elongated shape and closed at one end 3 and provided with an integral flange 4 at the other end projecting radially outwardly.

The longitudinal wall of the body 2 is relatively thin and by virtue of the material from which it is made is relatively flexible in a radial direction. The outer surface of the wall is formed during the moulding operation with three longitudinally extending ribs 5, spaced equi-circumferentially and including a short portion 6 tapering outwardly from the rear face of the flange and a relatively long rib portion 7 extending from the highest point of the first portion 6 and tapering inwardly towards the end 3 of the body remote from the flange 4. In effect, therefore, each rib 5 comprises two portions 6 and 7 tapering in opposite directions, the longer portion 7 extending from the end of the body remote from the flange 4 to a point adjacent to but spaced inwardly of the flange 4 and the shorter portion 6 extending from the longer portion 7 to the rear face of the flange 4. The ribs 5 are preferably of hollow form so that the inner surface of the tubular body will have a corresponding number of longitudinally spaced recesses and further the outer surface of the tapered ribs 5 will be formed by a relatively thin flexible wall.

As shown lamp bulb 8 is mounted in the tubular body 2, the connecting wires indicated by $x$ extending through holes in the closed end 3 of the body 2.

To assemble the socket 1 on the apertured panel $a$ the end 3 is entered into the aperture $a^1$ and forced axially therethrough. During this movement the tapered ribs 5 will engage the edges of the aperture and by virtue of their being hollow and also flexible, and also by virtue of the wall itself having a limited degree of flexibility, the ribs 5 will be flexed inwardly as the socket 1 is forced into the aperture until the edge of the latter passes over the highest point 9 of the ribs on to the short reversely tapered portion 6. In this position the underface 10 of the flange 4 will abut the adjacent face of the panel and the shorter tapered portion 6 will engage the opposite face of the support and provide a shoulder for retaining the socket 1 in assembly.

It will be understood that the thickness of the support will be less than the distance between the underface 10 of the flange 4 and the highest point 9 of the tapered ribs 5 such that when the socket 1 is fully assembled the inner edge of the aperture will engage the adjacent shorter reversely tapered portions 6 of the ribs 5 which will tend by virtue of their sloping faces to draw the socket further into the aperture and thereby urge the underface 10 of the flange 4 into closer abutment with the adjacent face of the panel.

A cover or lens is adapted to be assembled on the open end of the socket and may take the form of a dome or cap like member 11 (FIG. 1) having a radial flange 12 provided at its open end with a depending rim 13, the inner edge of which is tapered inwardly. The peripheral edge of the flange 4 on the socket is formed with a corresponding but reverse taper and is adapted to snap into engagement with the tapered rim 13 on the cover or lens.

It will be understood that the dome portion of the cover may be formed of transparent or translucent nylon or other synthetic plastic composition which may be colored as required.

According to an alternative arrangement the cover for the socket 1 comprises a dome or cap 14 having an axially depending rim 15 formed with a tapered inner edge 16 for snapping into engagement with a tapered peripheral edge of the flange 4 of the socket 1, instead, however, of the dome being formed with a lens it has a central opening 17 to permit the lamp bulb 8 mounted in the socket 1 to project therethrough.

According to the further alternative arrangement shown in FIG. 3 a lens 18 is provided the base of which rests in a recess 19 provided in the flange 4. The lens 18 is retained in position by a resilient cover member 20 provided with a depending rim 21 having a radially inwardly extending flange 22, under the undersurface 10a of the flange 4.

Although the invention has been particularly described with reference to a lamp socket it will be understood that it may take other forms and may serve as a plug, or as a support for any article other than a lamp.

I claim:

A lamp socket and like device having a body member for mounting in an apertured support, the body member being of resilient molded synthetic plastic material and comprising a body portion having a flange adjacent to one end and extending laterally outwardly, the said body portion also being formed with at least one rib extending longitudinally on its outer surface, the rib tapering toward the flange from a high point spaced from the flange and also tapered from said high point toward the end of the body portion remote from the flange, and the said rib serving as yieldable attaching means cooperating with said flange for securing the member in an apertured support and a cover member at the flange end of said body member, said cover member and the flange of said body member each having integral interengaging portions whereby said cover member may be snapped into engagement with said body member.

References Cited in the file of this patent

UNITED STATES PATENTS

| | | |
|---|---|---|
| D. 49,365 | Muller | July 11, 1916 |
| D. 126,506 | Derry | Apr. 8, 1940 |
| 1,031,976 | Weber | July 9, 1912 |
| 1,871,748 | Schramm | Aug. 16, 1932 |
| 2,091,490 | Prance | Aug. 31, 1937 |
| 2,297,616 | Funk | Sept. 29, 1942 |
| 2,496,938 | Friedman | Feb. 7, 1950 |
| 2,731,612 | Heller | Jan. 17, 1956 |